US008391782B2

(12) United States Patent
Holstegge et al.

(10) Patent No.: US 8,391,782 B2
(45) Date of Patent: Mar. 5, 2013

(54) WIRELESS TRANSMISSION OF SIGNALS

(75) Inventors: Jürgen Holstegge, Uttenreuth (DE); Robert Kagermeier, Nürnberg (DE); Eike Rietzel, Darmstadt (DE); Steffen Schröter, Fürth (DE); Dietmar Sierk, Erlangen (DE); Andres Sommer, Langensendelbach (DE)

(73) Assignee: Siemens Aktiengesellschaft, München (DE)

( * ) Notice: Subject to any disclaimer, the term of this patent is extended or adjusted under 35 U.S.C. 154(b) by 856 days.

(21) Appl. No.: 12/199,454

(22) Filed: Aug. 27, 2008

(65) Prior Publication Data

US 2009/0062937 A1 Mar. 5, 2009

(30) Foreign Application Priority Data

Sep. 4, 2007 (DE) ........................ 10 2007 041 902

(51) Int. Cl.
*H04B 7/14* (2006.01)

(52) U.S. Cl. ....................... 455/15; 455/41.2; 455/277.1

(58) Field of Classification Search ................. 455/8, 9, 455/15, 511, 41.1, 41.2, 41.3, 277.1, 335; 607/27

See application file for complete search history.

(56) References Cited

U.S. PATENT DOCUMENTS

| | | | | |
|---|---|---|---|---|
| 5,792,201 | A * | 8/1998 | Causey et al. | 607/27 |
| 7,073,083 | B2 * | 7/2006 | Litwin et al. | 713/324 |
| 2002/0003812 | A1 * | 1/2002 | Haartsen | 370/474 |
| 2004/0224641 | A1 * | 11/2004 | Sinn | 455/73 |
| 2008/0034248 | A1 * | 2/2008 | Danzer et al. | 714/1 |

FOREIGN PATENT DOCUMENTS

| | | | |
|---|---|---|---|
| DE | 103 17 131 | A1 | 10/2004 |
| DE | 10 2004 040 059 | A1 | 2/2006 |

OTHER PUBLICATIONS

German Office Action dated Dec. 12, 2007 with English translation.

* cited by examiner

*Primary Examiner* — Ping Hsieh

(74) *Attorney, Agent, or Firm* — Lempia Summerfield Katz LLC

(57) ABSTRACT

A system for wireless transmission of signals is provided. The system includes a mobile operator unit that is operable to transmit signals; and a base unit of a safety-critical device that is operable to receive signals from the mobile operator unit. The mobile operator unit is operable to categorize the signals to be transmitted as safety-relevant control signals and non-critical communication signals. Only the safety-relevant control signals are checked for error-free transmission. The non-critical communication signals are transmitted without error safety checking.

14 Claims, 1 Drawing Sheet

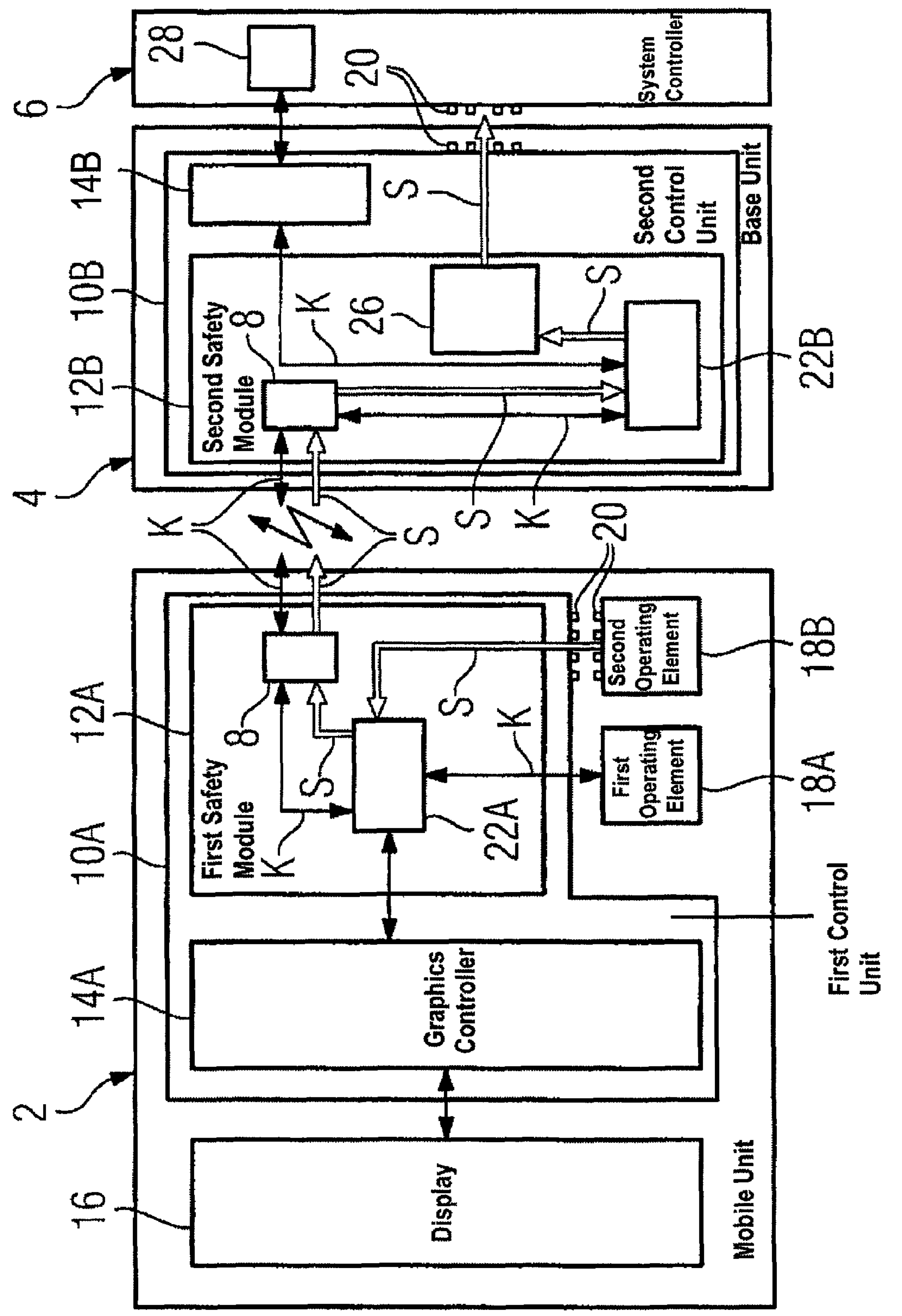
6
28
20
System Controller
4
14B
10B
12B
Second Safety Module
8
K
26
S
22B
Second Control Unit
Base Unit
K
S
20
2
14A
10A
12A
First Safety Module
22A
Graphics Controller
Display
16
First Operating Element
18A
Second Operating Element
18B
First Control Unit
Mobile Unit

WIRELESS TRANSMISSION OF SIGNALS

The present patent document claims the benefit of the filing date of DE 10 2007 041 902, filed Sep. 4, 2007, which is hereby incorporated by reference.

BACKGROUND

The present embodiments relate to wireless transmission of signals between a mobile operator unit and a base unit of a safety-critical device.

DE 10 2004 040 959 A1 discloses wireless transmission of signals between a mobile operator unit and a base unit of a safety-critical device, such as a medical treatment appliance. A safety-critical device may be a potential hazard for a patient to be treated. A malfunction during a wireless remote-controlled operation of the safety-critical device, which is caused by transmission errors in the wirelessly transmitted signals, should be precluded. According to DE 10 2004 040 059 A1, "first failure safety" is achieved by duplicating a signal to be transmitted and routing each copy of the duplicated input signal on a separate independent software path and wirelessly transmitting it to a base unit. The two copies are then checked for consistency in the base unit. If the signals match, a corresponding output signal is issued as a control signal for the safety-critical device.

Duplicating a signal to be transmitted and routing each copy of the duplicated input signal on a separate independent software path and wirelessly transmitting it to a base unit requires a comparatively large amount of computing power and creates a comparatively high level of complexity, which needs to be taken into account when the software is modified or extended.

SUMMARY

The present embodiments may obviate one or more of the drawbacks for limitations inherent in the related art. For example, in one embodiment, wireless signal transmission is simplified without compromising safety.

In one embodiment, the signals to be transmitted from a mobile operator unit to a fixed base unit include safety-relevant control signals and non-critical communication signals. The safety-relevant control signals are checked for error-free transmission, namely transmission error safety or first failure safety. The non-critical communication signals on the other hand are transmitted without error safety checking, and consequently separately from the control signals, between the base unit and the operator unit.

The signals may be divided into two types and transmitted separately over their own channels that are physically or logically separate from one another. The logical separation is achieved, for example, by specifying transmission in mutually discrete areas of a common transmission protocol.

The high outlay for the error-free transmission is made only for the specific signals that are actually safety-critical. The strict separation of these two types of signals ensures that there is no confusion between the signal types. The safety-relevant control signals are transmitted without errors. The separation of the signal types makes it easy to modify and maintain the underlying software, for example, the user interface software. The separation of these different signal types avoids confusion between safety-relevant and non-safety-critical functions. The non-safety-critical functions are easy to use. Examples of these functions are the menu guidance or display options on the operator unit. The logical separation of the signal types enables new devices to easily be made known to an operator unit, which devices can then be accessed via separate menus on the operator unit, for example.

An operator unit, which may be referred to below as a mobile unit, may be an input device that serves as a so-called user interface, via which the respective operator can transmit control signals to the device or can display signals about the status of the device. The operator unit may be a control console with switching and control elements and with a visual display element or a portable handheld device.

Safety-relevant control signals are signals that influence a positioning movement and/or radiation parameters of the device. Safety-relevant signals influence a function of the device, which could potentially endanger a patient or the fundamental operability of the device. The device cannot be moved by the control signals to a position at which the patient is already located, for example, or at which another object is located. Certain limit conditions also apply to the speed or acceleration of the positioning movements. Further safety-relevant functions for a medical appliance are the parameters collectively referred to as radiation parameters, by which the treatment of the patient is controlled. Treatment may be any intervention in the body of the patient with the aid of the medical appliance. The medical appliance may be, for example, a diagnostics unit, which radiates the patient for diagnostic purposes, such as an X-ray machine, a computer tomograph, or a magnetic resonance unit, for example. Alternatively, the medical appliance is, for example, a therapeutic device with which a tumor is treated directly by particle radiation.

Radiation parameters may be parameters that are used to set the radiation intensity, the radiation duration, the type of radiation, the focus of radiation, or the distance of the radiation source from the patient.

Since they are control signals for the device, the safety-relevant signals may be transmitted unidirectionally from the operator unit to the base unit. Checking for error-free transmission may be performed only in the direction from the operator unit to the base unit. In an alternative embodiment, the safety-relevant signals are transmitted and checked bidirectionally.

The non-critical communication signals may be either graphics signals or selection signals. Graphics signals may be signals that are used to modify the display settings on the operator unit or also on the medical appliance. Displays settings are, for example, special user interfaces of an operator menu or the controlling of signal lamps. Selection signals may be signals used to choose and select non-safety-relevant device functions. Device functions are, for example, functions relating to image presentation, such as the zoom factor, focus settings, choice of image areas, or selection of data to be displayed. During a medical treatment, the progress or the result of the current treatment may be displayed in parallel on one or more monitors. A multi-level menu may be called up on one or more monitor. In this case the control of the individual display monitors, the selection of the respective menu, the selection of a particular calculation algorithm are device functions that have no direct influence on the patient and consequently do not pose a hazard.

In one embodiment, the signals are encoded by a check code in the mobile unit and are decoded again in the base unit. The check information or a check code is added to the signals. The check information or check code may be used to check the error-free transmission of the respective individual signal. Each individual signal is provided with specific unique check information. For example, a CRC (Cyclic Redundancy Code), such as a 32-bit CRC, is assigned. Alternatively or additionally, the control signals are transmitted redundantly, that is to say a copy is made of the respective individual signal to be transmitted, then the copy is transmitted and a check is performed again in the base unit to verify that the copy matches the original transmitted, which is transmitted in parallel, as disclosed in DE 10 2004 040 059 A1.

In one embodiment, a control unit is provided in the operator unit and/or in the base unit. The control unit is used for the differentiation into safety-relevant control signals and non-critical communication signals. In the respective control unit, the signals are processed separately from one another and prepared for transmission in the operator unit and in the base unit.

Hardware may be used for the differentiation into safety-critical control signals and non-critical communication signals. For example, the safety-relevant control signals may be input into the control unit via a defined contact assignment (pin assignment) of connecting contacts on the respective control unit. Signals present at the defined connecting contacts are automatically identified as safety-relevant control signals. For this purpose there is a 1:1 wiring between operating elements, such as control knobs, buttons and switches, for example, and the control unit of the operator unit. There is no software preprocessing of the control signals. The individual operating elements for the execution of the control signals are connected to a respective assigned input pin of the control unit. At least one of the input pins is assigned to each operating element.

In one embodiment, the non-safety-critical communication signals may be transmitted over a data bus, such as a single data line for different signals.

In one embodiment, the control unit includes a safety module for processing the safety-critical control signals and a further module for processing the non-critical communication signals. The separation of the different signal types is maintained consistently because of the logical or hardware division of the control unit. This permits for example simple configuration, modification or maintenance of the software of the further module for the non-critical communication signals. There is no interaction with the processing of the safety-critical control signals. Overall, therefore, modifications can be easily made. The further module is a controller for the graphics devices, for the user interface, or for the non-safety-relevant device functions. The further module in the operator unit is designed as a graphics controller for a display element. In the base unit, the further module is a controller (UI controller) for the user interface. The further module may be used to set, program, and change the functionality of the user interface, (e.g., the mobile operator unit). Such settings relate, for example, to the graphical settings or the settings for which type of devices can be controlled from the operator unit. The safety-critical functions, such as control signals for positioning movements, for example cannot be influenced by the UI controller. The further module designed as a UI controller may be an operator module. The further module may handle the control of the functionality of the mobile unit.

A control unit with a safety module may be provided in both the base unit and in the operator unit. The two safety modules may control the transmission of the signals. The exchange and the communication are performed via the safety modules, both with respect to the safety-critical control signals and with respect to the non-critical communication signals. The encoding is performed in the safety module of the operator unit and the decoding of the safety-relevant control signals is performed in the safety module of the base unit.

The actual control of the device is undertaken at the device end via the base unit. The safety-critical communication with a system controller of the device is undertaken via the safety module. The safety module transmits the safety-critical control signals, whereas the communication signals are exchanged with the device via the operator module. The safety-critical control signals may be sent over a 1:1 wiring between the safety module of the base unit and the system controller, whereas the communication signals may be exchanged over a data bus.

BRIEF DESCRIPTION OF THE DRAWING

Non-limiting and non-exhaustive embodiments are described with reference to the following drawing. The components in the drawing are not necessarily to scale, emphasis instead being placed upon illustrating the principles of the present embodiments.

FIG. 1 illustrates one embodiment of a system for wireless transmission of signals between a mobile operator unit and a base unit that controls a safety-critical device.

DETAILED DESCRIPTION

In FIG. 1, the system includes a mobile unit 2, a base unit 4 and a system controller 6. The system shown in FIG. 1 may be used in or with a safety-relevant device. The mobile unit 2 is an independent and freely movable unit. The mobile unit 2 may include a housing, such that the mobile unit 2 is portable or moveable in a room. The base unit 4 may be permanently connected to a main component of the safety-relevant device. A system controller 6 may be integrated in the safety-relevant device. In one embodiment, the safety-critical device is a medical treatment appliance and the room is a treatment room.

The mobile unit 2 and the base unit 4 communicate with one another wirelessly. The mobile unit 2 and base unit 4 may include a wireless communications interface 8 for wireless communication with one another. The wireless communications interface 8 may communicate according to the Bluetooth standard, for example.

The mobile unit 2 includes a first control unit 10A, which includes a first safety module 12A and a second module, which may be a graphics controller 14A. The base unit 4 includes a second control unit 10B, a second safety module 12B, and a second module, which may be an operator module 14B. Alternatively, the operator module 14B may be a user interface (UI) controller.

The mobile unit 2 may include a display 16, for example, a screen. The mobile unit 2 may include operating elements 18A, 18B. The operating elements 18A, 18B may be used as inputs to control the medical appliance, for example, by an operator. The display 16 may provide the operator with information, for example, about the status of the safety-relevant device, and present menus for selection.

The operating elements 18A, 18B may have different functions. The operating element 18A may serve exclusively for the input of non-critical communication signals K. The operating element 18B may serve exclusively for the input of safety-relevant control signals S. The first operating element 18A may be an input element, such as a touchscreen or other software-supported operating element. The second operating element 18B may be directly connected as hardware, such as direct wiring, to the first safety module 12A. In one exemplary embodiment, as shown in FIG. 1, the individual contact pins 20 may be connecting contacts between an operating element 18B and the first control unit 10A. There may be a 1:1 pin assignment between the operating element 18B and a contact pin 20 of the first control unit 10A.

The control signals S are transmitted from the operating element 18B to a first computer unit (e.g., microprocessor) 22A of the first safety module 12A. The communication signals K are transmitted from the first operating element 18A to the computer unit 22A. Alternatively, the communication signals K may be transmitted from the first operating elements 18A to the computer unit 22 via the graphics controller 14A.

The signals K, S are fed (transmitted) separately to the computer unit 22. The signals K, S may be processed separately from one another. The communication signals K are forwarded without further safety-relevant preprocessing to the communications interface 8 for transmission to the base unit 4. They are then preprocessed for transmission and transmitted in said communications interface 8.

The safety-relevant control signals S are preprocessed in the computer unit 22, for example, as described in DE 10 2004 040 059 A1. The computer unit 22 duplicates the respective control signal S. Each incoming control signal S is duplicated so that it is redundantly present. A copy of the duplicated control signal S may be inverted. The original and the copy of the respective individual control signal S are then provided with check information, such as a Cyclic Redundancy Code (CRC), and are forwarded to the communications interface 8 for preprocessing and transmission.

The signals K, S are received at the base unit 4 by the communications interface 8. The signals K, S are forwarded (transmitted) to a second computer unit 22B located in the second safety module 12B for further processing. The computer unit 22B differentiates between the communication signals K and the control signals S. The communication signals K are forwarded essentially without any special processing, and the safety-relevant control signals S are decoded in the computer unit 22B. The check information is first checked to determine whether the arriving data signals are plausible. After inversion, if appropriate, the redundantly transmitted information of the respective individual control signal S is compared to verify consistency. If an error-free transmission is identified, the control signals S are transmitted to a signal output module 26, via which the control signals S are then forwarded to the system controller 6 of the medical appliance.

The system controller 6 is connected to the second control module 10B. The second control module 10B may transmit the control signals S to the to the system controller via corresponding contact pins 20 having a 1:1 pin assignment and a wiring.

The communication signals K are transmitted from the computer unit 22B to the operator module 14B. The operator module 14B may preprocess the communication signals K and forward (transmit) the communication signals K to the system controller 6. Data exchange of the communication signals K between the operator module 14B and the system controller 6 may be performed using a bus module 28. A data bus, for example, a controller area network (CAN) bus, may be used for transmission.

The management and control of the individual functions of the mobile unit 2 may be stored in the operator module 14B. The functionality of the mobile unit 2 is determined by the operator module 14B. Functionality includes which technical devices can be controlled by the mobile unit 2 or also which functions of an individual technical device can be controlled by the mobile unit 2. For example, it is possible to access via the mobile unit 2 special data or special menu structures, or also to set up, suppress, or grant user-dependent access to special device components of the medical appliance. A plurality of monitors could be provided on the medical appliance, for example. The functionality of the mobile unit 2 is then set up via the operator module 14B to the extent that, for example, switching over between the different monitors is permitted. Influencing the functionality of the safety-critical second operating elements 18B is not covered by the operator module 14B since the safety-critical control signals S are output via said elements.

The operator module 14B may be used to configure the mobile unit 2. The operator module 14B may include a download function that allows configuration data to be transmitted, for example, from the system controller 6 via the operator module 14B, as communication signals K to the graphics controller 14A. The configuration data are, for example, bitmaps, such as graphics data for the user interface or text messages.

As shown in FIG. 1, there is a strict separation between the communication signals K and the control signals S on the entire signal path between the mobile unit 2 and the system controller 6. As a result of the functional separation, in particular on the control units 10A, B which each have a separate module (graphics module 14A and operator module 14B respectively) implemented logically or as hardware for the communication signals K, simple and problem-free set-up, programming, or modification of the entire communications layer is possible. The communications layer may include all, some, or none of the components that are responsible for the functionality with respect to the communication signals K, such as the graphical representation (graphics signals, display settings) or the selection of signals for controlling non-safety-relevant device functions. As a consequence, simple maintenance and handling of the communications layer is enabled overall. At the same time, the safety-critical transmission of the control signals S is not affected.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A method for the wireless transmission of a signal between a mobile operator unit and a base unit of a safety-critical device, the method comprising:

categorizing one or more signals to be transmitted as safety-relevant control signals and one or more signals to be transmitted as non-critical communication signals;

transmitting the safety-relevant control signals and the non-critical communication signals between the mobile operator unit and the base unit;

differentiating the safety-relevant control signals and the non-critical communication signals using a control unit in the mobile operator unit, the base unit, or the mobile operator unit and the base unit;

processing, using a safety module of the control unit, the safety-relevant control signals separately from processing, using a further module of the control unit, the non-critical communication signals;

checking the safety-relevant control signals for error-free transmission; and transmitting the safety-relevant control signals via a defined contact assignment of connecting contacts of the control unit and transmitting the non-critical communication signals over a data bus, wherein the non-critical communication signals are transmitted without error safety checking.

2. The method as claimed in claim 1, wherein the safety-relevant control signals include signals that influence a positioning movement, radiation parameters of the safety-critical device, or the positioning movement and the radiation parameters of the safety-critical device.

3. The method as claimed in claim 1, wherein the non-critical communication signals include graphics signals or selection signals, the graphics signals being used to change display settings and the selection signals being used to select non-safety-relevant device functions.

4. The method as claimed in claim 1, further comprising:
encoding the safety-relevant control signals in the mobile operator unit; and
decoding the safety-relevant control signals in the base unit.

5. The method as claimed in claim 1, further comprising transmitting the safety-relevant control signals redundantly,
wherein checking includes checking for a match in the base unit.

6. The method as claimed in claim 1, wherein the control unit is in the base unit, and
wherein the control unit of the base unit has a module that controls one or more functions of the mobile operator unit.

7. The method as claimed in claim 1, wherein the base unit includes a first control unit with a first safety module, and the mobile operator unit includes a second control unit with a second safety module, the first safety module and the second safety module operable to control the transmission of the safety-relevant control signals and the non-critical communication signals, and
wherein the control unit is the first control unit or the second control unit, and the safety module is the first safety module or the second safety module.

8. The method as claimed in claim 7, further comprising:
transmitting the safety-relevant control signals to a system controller of the safety-critical device via the safety module; and
exchanging the non-critical communication signals with the safety-critical device via a module of the base unit.

9. The method as claimed in claim 1, further comprising configuring, modifying, or performing maintenance on software of the further module for the non-critical communication signals without any interaction with the processing of the safety-relevant control signals.

10. A system for wireless transmission of signals, the system comprising:
a mobile operator unit, the mobile operator unit comprising a first control unit, the mobile operator unit being operable to transmit signals;
a base unit of a safety-critical device, the base unit comprising a second control unit, the second control unit comprising connecting contacts, the base unit being operable to receive signals from the mobile operator unit; and
a system controller comprising a bus module,
wherein the first control unit is operable to categorize the signals to be transmitted as safety-relevant control signals and non-critical communication signals, and is operable to process, using a safety module of the first control unit, the safety-relevant control signals separately from processing, using a further module of the first control unit, the non-critical communication signals,
wherein the second control unit is operable to transmit the safety-relevant control signals to the system controller via a defined contact assignment of the connecting contacts, and the second control unit is operable to transmit the non-critical communication signals to the system controller via the bus module, and
wherein only the safety-relevant control signals are checked for error-free transmission, the non-critical communication signals being transmitted without error safety checking.

11. The system as claimed in claim 10, wherein the safety-critical device is a medical treatment appliance.

12. The system as claimed in claim 10, wherein the base unit is operable to transmit signals to the mobile operator unit.

13. The system as claimed in claim 12, wherein the base unit is operable to categorize the signals to be transmitted as safety-relevant control signals and non-critical communication signals.

14. The system of claim 10, wherein the system controller is integrated in the safety-critical device.

* * * * *